Patented May 29, 1945

2,377,145

UNITED STATES PATENT OFFICE 2,377,145

DYESTUFFS OF THE ANTHRAQUINONE SERIES AND A PROCESS FOR THEIR MANUFACTURE

Ernst Gutzwiller, Basel, Switzerland, assignor to Sandoz A. G., Fribourg, Switzerland, a Swiss firm No Drawing. Application November 25, 1941, Serial No. 420,426. In Switzerland December 13, 1940

10 Claims. (Cl. 260—374)

The present invention relates to new dyestuffs of the anthraquinone series and to a process for their manufacture.

In the U. S. patent specification 2,226,909 halogenated anthraquinone dyestuffs dyeing wool in reddish-blue shades of good fastness properties have been described. But the dyeings obtained with these dyestuffs possess a very disadvantageous property insofar, as they change their shade very strongly to red in artificial light. Therefore, these dyestuffs have not found any practical use in the technic.

Now it has been found that the above cited dyestuffs of the U. S. patent specification 2,226,909 can be greatly improved with regard to the change of the shade in the artificial light by introducing in these dyestuffs in position 6 and/or 7 a halogen atom. In order to prepare such halogenated compounds, there are used, as starting products, anthraquinone compounds of the general formula

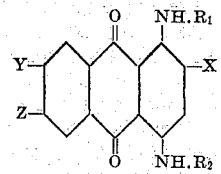

wherein $R_1$ stands for hydrogen, alkyl or the radical of the formula

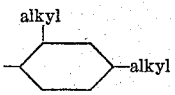

$R_2$ represents the radical of the formula

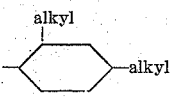

X stands for hydrogen, halogen, alkyl, sulfo or cyano group, Y and Z stand for a halogen and hydrogen, and wherein at least in one of the positions Y and Z there stands a halogen atom, and a halogen is introduced into the phenyl radical in ortho-position to the secondary amino group by treatment with halogenating agents, and the so-obtained halogenated anthraquinone derivatives are eventually subjected to a treatment with a sulfonating agent in order to make them water-soluble.

Under the term alkyl cited in the general formula hydrocarbon radicals with one or a plurality of carbon atoms, specific examples of which are the methyl, ethyl, propyl, isopropyl, butyl and isobutyl groups are to be understood.

As halogenating agents the halogens like chlorine and bromine and their derivatives yielding halogen, such as the sulfuryl chloride and bromide are used. The halogenation of the above cited compounds can be carried out in presence of convenient promoters such as iodine, sulphur and iron and preferably in a diluting agent or a solvent such as water, sulfuric acid, ethanol, amyl-alcohol, glacial acetic acid, toluene, chlorobenzenes and nitrobenzene. The anthraquinone derivatives are, if desired, first transformed into their salts of halogen acids, for instance by treating the same with aqueous or gaseous hydrochloric acid, and thereupon treated with the halogenating agents preferably at a low temperature and, if desired, under cooling in such a manner, that the reaction temperature remains between 0° and 80° C. Generally a dark colored intermediate product becomes first formed, which slowly transposes into the stable halogen compound. This transposition is more rapid, if the compound is warmed up to 100°–150° C. on a water or oil bath.

According to the basicity of the anthraquinone compound and of the solvent used, the formed hydrogen halide acid evolves from the reaction mixture or remains dissolved therein. Sometimes, it is advantageous to carry out the halogenation of the anthraquinone compounds in presence of acid binding agents such as sodium acetate, sodium bicarbonate and magnesium oxide.

The resulting halogenated product can generally be separated from the reaction mass by simple filtration, but in the cases where a volatile solvent has been used, the same may be first blown off with steam and the reaction product isolated from the remaining solution. The reaction products are generally obtained in a fairly pure state and can be purified by crystallization or by dissolving them in sulfuric acid and precipitation by means of water. The halogeno-compounds thus obtained are insoluble in water and can be used for coloring lacquers and plastic masses. In order to convert the same into water-soluble derivatives, the bases obtained as above described are treated at a temperature of −10° to +50° C. with a sulfonating agent, such as sulfuric acid, fuming sulfuric acid or chlorosulfonic acid, or in the case they contain replaceable halogen atoms, they are heated with sulfite according to the well known methods.

The water-soluble anthraquinone compounds obtained in this manner are valuable acid dyestuffs for animal fibres, possessing excellent fastness properties and producing very brilliant shades.

The water-soluble dyestuffs obtained according to the present process correspond to the general formula

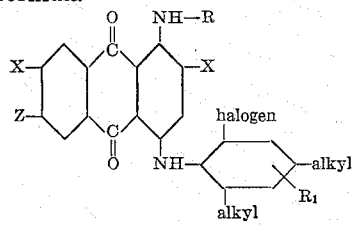

wherein R stands for a member selected from the group consisting of hydrogen, alkyl and the radical

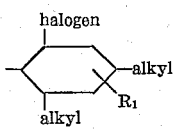

$R_1$ stands for a member selected from the group consisting of hydrogen and sulfo, X stands for a member selected from the group consisting of hydrogen, halogen, sulfo, alkyl and cyano, Y and Z stand for a member selected from the group consisting of hydrogen and halogen and wherein at least in one of the positions Y and Z there stands a halogen atom, and wherein at least one sulfo group is present in the molecule in the positions indicated by $R_1$ and X.

The following examples, without being limitative, illustrate the present process, the parts being by weight.

*Example 1*

15 parts of 1:4-di-(2':4'-dimethyl)-phenyl-amino-6-chloroanthraquinone (prepared for example by condensation of 1:4:6-trichloro-anthraquinone with meta-xylidine or by condensation of 6-chloroquinizarine, respectively its leuco compound, with xylidine) are suspended in 400 parts of chlorobenzene and treated at room temperature with a mixture of 10.5 parts of bromine in 25 parts of chlorobenzene. The reaction mass is first stirred at room temperature and then the temperature is increased up to 50 to 120° C., until the bromination has finished. The chlorobenzene is then distilled off by means of steam and the bromo compound separated by filtration. The dyestuff base thus obtained is soluble in organic solvents with a blue coloration.

5 parts of the dry base are dissolved in 15 parts of sulfuric acid monohydrate, treated with 10 parts of oleum 28% and stirred at 40° C., until a test is completely soluble in water. The dyestuff is isolated in the usual manner, e. g. by pouring the sulfonation mass into salt water, filtration and drying. It dyes wool in beautiful brilliant blue shades, which remain blue in artificial light, and which possess the following formula

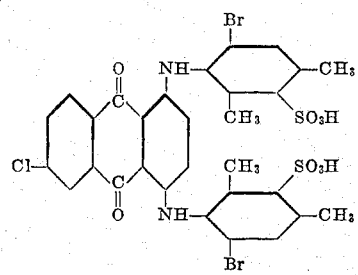

If in this example the respective 6-bromo- derivative is used, a dyestuff will be obtained, which dyes wool in similar shades as the 6-chloroderivative.

*Example 2*

10 parts of 1:4-di-(2':4'-dimethyl)-phenyl-amino-6:7-dichloroanthraquinone (prepared for example by condensation of 6:7-dichloroquinizarine, respectively its leuco compounds, with meta-xylidine) are suspended in 200 parts of chlorobenzene and brominated, as described in Example 1, with 6.5 parts of bromine dissolved in 20 parts of chlorobenzene. The base thus obtained is then sulfonated in the same manner as described in Example 1. The dyestuff thus obtained dyes wool in valuable, beautiful blue shades of excellent fastness properties to the artificial light and possesses the following formula

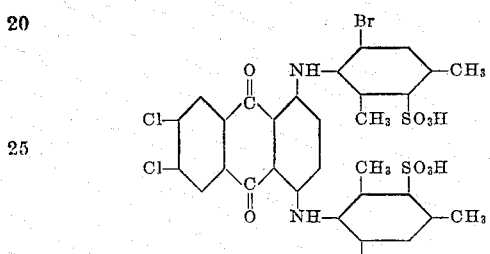

*Example 3*

14 parts of 1-amino-2-bromo-4-(2':4'-dimethyl)-phenylamino-6- or -7-chloroanthraquinone (prepared by dibrominating the 1-amino-6- or -7-monochloroanthraquinone and condensation with meta-xylidine) are suspended in 150 g. of dichlorobenzene and treated with 5.2 parts of bromine, dissolved in 20 parts of dichlorobenzene. After stirring several hours at room temperature, the charge is warmed up for a short time on the water bath. After blowing off the solvent and filtration, the base thus obtained is dried. 10 parts of this base are heated in an autoclave during 16 hours at 140° C. with 40 parts of phenol and 20 parts of a 30% aqueous potassium sulfite solution. The phenol is then blown off and the dyestuff separated out. It dyes wool in brilliant blue shades of good fastness properties and possesses the formula

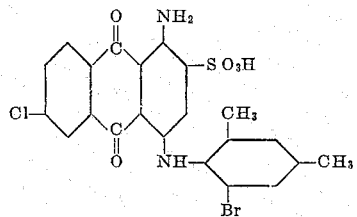

This dyestuff can further be sulfonated by treatment with weak oleum, whereby a very easily water-soluble dyestuff, dyeing wool in some redder shades, will be obtained.

By using instead of the 6-monochloro derivative the respective 6:7-dichloro derivative, a dyestuff will be obtained that dyes wool in greener shades than those obtained with the monochloro compounds.

By using instead of 1-amino-2-bromo-4-(2':4'-dimethyl)-phenylamino-6- or -7-mono-, or -6:7-dichloroanthraquinone, and equivalent quantity of 1-amino-2-cyano-4-(2':4'-dimethyl)-phenylamino-6- or -7-monochloro- or -6:7-dichloro-anthraquinone respectively bromo derivatives will be obtained, that dye wool in greener shades than the respective products possessing in 2-position of the anthraquinone nucleus an atom of bromine.

Example 4

15 parts of 1-amino-2-bromo-4-(2':4'-dimethyl)-phenylamino-6- or -7-monobromoanthraquinone are suspended in 150 parts of chlorobenzene and treated with a solution of 5 parts of bromine in 200 parts of chlorobenzene. After stirring for several hours at room temperature, the reaction mass is heated up to 80°–120° C. After a very short time the reaction has completed and the chlorobenzene can be blown off with steam. The base is then separated by filtration and dried.

By treating this base with sulfites in the manner described above or with diluted oleum or by a combined sulfonation, mono- or disulfonated dyestuffs dyeing wool in blue shades will be obtained.

The dyestuff possesses the formula

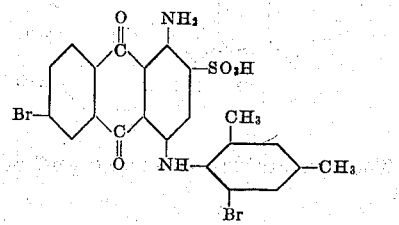

or

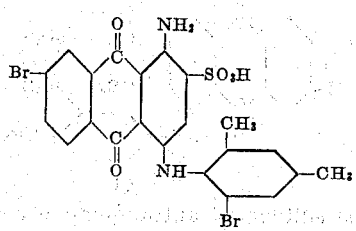

Example 5

15 parts of 1:4-di(2':4'-dimethyl)-phenylamino-6-chloroanthraquinone are suspended in 400 parts of chlorobenzene. After addition of 0.2 part of iodine 10 parts of sulfuryl chloride are slowly introduced into the suspension and the reaction mass stirred at 40° C., until the reaction has taken place. The dyestuff thus obtained is isolated as described in Example 1, and sulfonated with oleum. The dyestuff so obtained dyes wool in blue shades and possesses the following formula

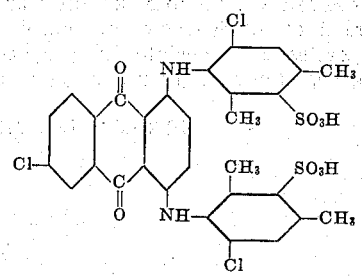

What I claim is:

1. A process for the manufacture of anthraquinone compounds, comprising the introduction of halogen into the phenyl radical in ortho-position to the secondary amino group by treatment with a halogenating agent of an anthraquinone derivative of the general formula

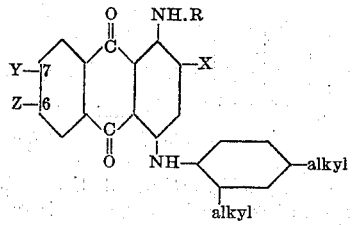

wherein R stands for a member selected from the group consisting of hydrogen, alkyl and the radical

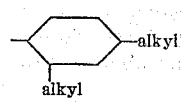

X stands for a member selected from the group consisting of hydrogen, halogen, sulfo, alkyl and cyano, Y stands for a halogen atom in one of the positions 6 and 7 and Z stands for a member of the group consisting of hydrogen and halogen in the other one of the positions 6 and 7, and treating the base thus obtained with a sulfonating agent.

2. A process for the manufacture of anthraquinone compounds, comprising the introduction of halogen into the phenyl radical in ortho-position to the secondary amino group by treatment with a halogenating agent of an anthraquinone derivative of the general formula

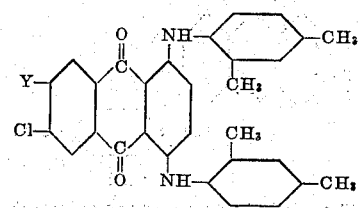

wherein Y stands for a member of the group consisting of hydrogen and halogen, the molecular proportions of anthraquinone derivative and halogenating agent being such as to provide only one atom of halogen per phenyl group of said derivative, and treating the base thus obtained with a sulfonating agent.

3. A process for the manufacture of a new anthraquinone compound, comprising the introduction of bromine into the phenyl radical in ortho-position to the secondary amino group by treatment with bromine at 20°–120° C. in the presence of chlorobenzene of the compound of the formula

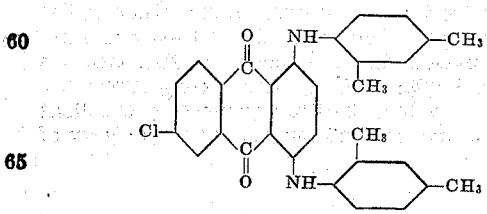

and subsequent sulfonation of the halogenated base thus obtained with fuming sulfuric acid at about 40° C.

4. A process for the manufacture of a new anthraquinone compound, comprising the introduction of bromine into the phenyl radical in ortho-position to the secondary amino group by treatment with bromine at 20–120° C. in the presence of chlorobenzene of the compound of the formula

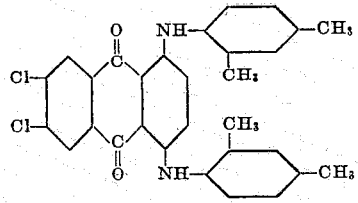

and subsequent sulfonation of the halogenated base thus obtained with fuming sulfuric acid at about 40° C.

5. A process for the manufacture of a new anthraquinone compound, comprising the introduction of chlorine into the phenyl radical in ortho-position to the secondary amino group by treatment with sulfuryl chloride in the presence of iodine and of chlorobenzene of the compound of the formula

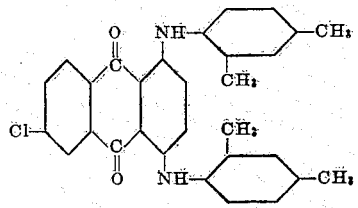

and subsequent sulfonation of the halogenated base thus obtained with fuming sulfuric acid at about 40° C.

6. The new sulfonated anthraquinone compounds of the general formula

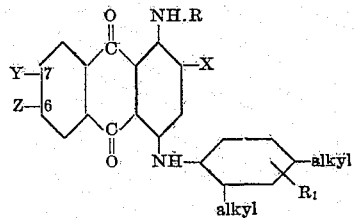

wherein R stands for a member selected from the group consisting of hydrogen, alkyl and the radical

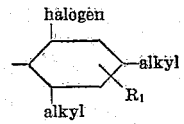

$R_1$ stands for a member selected from the group consisting of hydrogen and sulfo, X stands for a member selected from the group consisting of hydrogen, halogen, sulfo, alkyl and cyano, Y stands for a halogen atom in one of the positions 6 and 7 and Z stands for a member of the group consisting of hydrogen and halogen in the other of the positions 6 and 7, and wherein at least one sulfo group is present in the molecule in the positions indicated by $R_1$ and X, which compounds are water-soluble acid dyestuffs possessing excellent fastness properties and especially the property of not changing the shade of their dyeings in the artificial light.

7. The new anthraquinone dyestuff of the formula

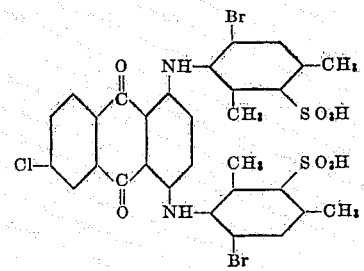

8. The new anthraquinone dyestuff of the formula

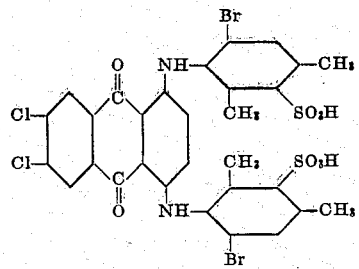

9. The new anthraquinone dyestuff of the formula

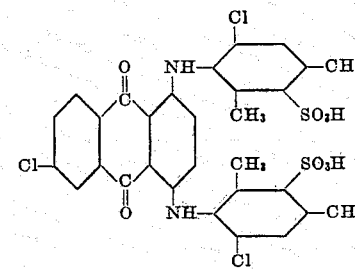

10. The sulfonated anthraquinone compounds of the formula

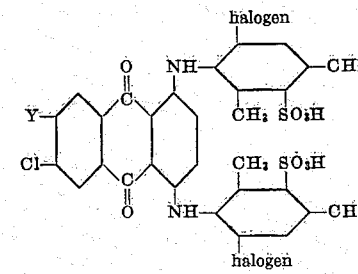

wherein Y stands for a member of the group consisting of H and Cl, which compounds are water-soluble acid dyestuffs possessing excellent fastness properties and especially the property of not changing the shade of their dyeings in artificial light.

ERNST GUTZWILLER.